(12) United States Patent
Sievers et al.

(10) Patent No.: US 9,061,638 B2
(45) Date of Patent: Jun. 23, 2015

(54) CONTROL UNIT FOR OPERATING A SAFETY SYSTEM FOR A VEHICLE, AND METHOD FOR OPERATING SUCH A SAFETY SYSTEM FOR A VEHICLE

(75) Inventors: Falko Sievers, Reutlingen (DE); Hartmut Schumacher, Freiberg (DE); Carsten List, Walheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 77 days.

(21) Appl. No.: 13/638,885

(22) PCT Filed: Mar. 10, 2011

(86) PCT No.: PCT/EP2011/053615
§ 371 (c)(1),
(2), (4) Date: Dec. 20, 2012

(87) PCT Pub. No.: WO2011/138080
PCT Pub. Date: Nov. 10, 2011

(65) Prior Publication Data
US 2013/0124051 A1    May 16, 2013

(30) Foreign Application Priority Data

May 4, 2010   (DE) .......................... 10 2010 028 544

(51) Int. Cl.
*B60R 21/01*    (2006.01)
*B60R 21/017*   (2006.01)
(Continued)

(52) U.S. Cl.
CPC ............... *B60R 21/01* (2013.01); *B60R 21/017* (2013.01); *H02J 7/1461* (2013.01); *H02J 7/345* (2013.01); *H02M 3/158* (2013.01)

(58) Field of Classification Search
CPC ......... B60R 21/01; H02J 7/1461; H02J 7/345
USPC .......................................................... 701/45
See application file for complete search history.

(56) References Cited

U.S. PATENT DOCUMENTS 6,963,497 B1   11/2005  Herbert
2008/0246452 A1  10/2008  Sievers et al.
(Continued)

FOREIGN PATENT DOCUMENTS

CN        101013851    8/2007
DE     10 2004 057690   6/2006
(Continued)

OTHER PUBLICATIONS

EPO english translation of DE 19542085 B4.*

*Primary Examiner* — Fadey Jabr
*Assistant Examiner* — Yazan A Soofi
(74) *Attorney, Agent, or Firm* — Kenyon & Kenyon LLP (57) ABSTRACT

A control unit and a method for operating a safety system for a vehicle are proposed. A step-up converter configured as a switching converter is provided. The step-up converter converts an input voltage, which is derived from a vehicle battery voltage, into a higher charging voltage at its output. In addition, at least one energy reserve storage is provided which is charged via the charging voltage for operating the safety system in the case of autonomous operation. At least one step-down converter is operated inversely with respect to the step-up converter, the at least one step-down converter converting down the charging voltage or a voltage which is output by the at least one energy reserve storage.

8 Claims, 6 Drawing Sheets

(51) Int. Cl.
*H02J 7/34* (2006.01)
*H02J 7/14* (2006.01)
*H02M 3/158* (2006.01)

(56) References Cited

U.S. PATENT DOCUMENTS

2009/0066277 A1    3/2009   Ang et al.
2009/0315401 A1*  12/2009   Yoshida et al. ................. 307/44

FOREIGN PATENT DOCUMENTS

| | | |
|---|---|---|
| DE | 195 42 085 | 7/2007 |
| DE | 19542085 B4 * | 7/2007 |
| DE | 20 2009 007299 | 8/2009 |
| DE | 10 2009 022822 | 12/2010 |
| EP | 1 786 089 | 5/2007 |
| JP | 8-275511 | 10/1996 |
| JP | 10-217902 | 8/1998 |
| JP | 2007-249812 | 9/2007 |
| JP | 2008-522575 | 6/2008 |

* cited by examiner

CONTROL UNIT FOR OPERATING A SAFETY SYSTEM FOR A VEHICLE, AND METHOD FOR OPERATING SUCH A SAFETY SYSTEM FOR A VEHICLE

FIELD OF THE INVENTION

The present invention relates to a control unit and a method for operating a safety system for a vehicle.

BACKGROUND INFORMATION

A safety device for vehicle occupants is discussed in DE 195 42 085 B4, a capacitor for the energy storage being provided, and a first voltage converter being provided which is connected to the vehicle battery and which steps up the voltage of the vehicle battery to a multiple of the voltage of the vehicle battery, and which charges the capacitor with this higher voltage. A second voltage converter is provided for connection via its output to an input of a voltage stabilizer. In addition, a microcontroller which controls the voltage converters is provided, and the voltage converters are controllable by a serial interface of the microcontroller. A device and a method for charging an electrical energy storage device are discussed in DE 10 2004 057 690 A1. Active current limitation is provided in a main current path in order to limit a supply current to a given maximum current. A voltage converter device is situated downstream from the current limiting device for raising the potential of the electrical energy storage device above a supply potential.

SUMMARY OF THE INVENTION

The control unit according to the present invention and the method according to the present invention for operating a safety system for a vehicle have the advantage over the related art that at least one step-down converter is operated inversely with respect to the step-up converter, the step-down converter downwardly converting the charging voltage or the voltage which is output by the energy store. A reduction of an alternating component, i.e., an alternating voltage at the output of the step-up converter, is thus possible due to the fact that energy is picked up by the at least one step-down converter due to the inverted operation at the moment of the energy output (freewheeling mode) of the step-up converter. As a result, a dynamic balance is achieved which is accompanied by a small alternating component at the output of the step-up converter.

In the present context, a control unit is understood to mean an electrical device which processes sensor signals, and as a function thereof controls a safety system, for example a passive passenger protection system having airbags and seat belt tensioners. The control unit usually has its own housing made of metal and/or plastic; however, it may also be configured, at least partially, using shared components on various devices. Active and passive safety systems may be situated in a shared housing.

The operation of the safety system means that the safety system is activated in a safety-relevant case for which it is configured. If, for example, an accident occurs which requires the activation of an airbag, the control unit outputs a control signal in order to activate the appropriate airbags.

In the present context, the safety system is understood to mean a passive safety system such as airbags or seat belt tensioners, or also an active safety system, such as an electronic stability program for the vehicle or a traction control system.

A step-up converter is a component, usually electronic, having an inductor which converts the input voltage to an output voltage which is higher than the input voltage. For this purpose, the step-up converter is configured as a switching converter. Such a step-up converter has, for example, an inductor, and therefore a coil, which is connected in series with a freewheeling diode or a freewheeling transistor, which in the present case is implementable in integrated form. A charging capacitor which sums the output voltages is provided downstream from the freewheeling diode. The coil is connected to ground via a switch. An input voltage drops at the coil, whereby the current through the coil, and thus the energy stored in the magnetic field, increases. When the switch is opened, the coil attempts to maintain the current flow. The voltage at the secondary end of the coil rises very quickly until the voltage present at the capacitor is exceeded, and the diode opens. Initially, the current continues to flow unchanged, and further charges the capacitor. The magnetic field collapses and outputs its energy by driving the current through the diode, into the charging capacitor, and to the load. In general terms, the inductor acts as a load in the charging process and absorbs energy, and in the discharging process the inductor acts as an energy source, similar to a battery. Therefore, a distinction is made between the charging phase and the so-called freewheeling phase. In the freewheeling phase, energy is transported to the output of the step-up converter.

The input voltage derived from the vehicle battery is, for example, a filtered and polarity reversal-protected voltage which is derived directly from the vehicle battery voltage.

The charging voltage at the output of the step-up converter is higher than the input voltage, as explained by the term "step-up converter."

The at least one energy reserve storage is usually one or multiple capacitors which is/are charged with the charging voltage, present at the output of the step-up converter, for operating the safety system in the case of autonomous operation. Autonomous operation occurs when the supply to the vehicle battery is interrupted due to an accident, for example. The charge current source, which is programmable during operation, is usually a current controller. This involves a transistor circuit which acts as a current control valve, a logic system being contained which converts the programming into a corresponding current value. In this way, the charge current may be adjusted during operation, i.e., when the vehicle is switched on and the battery voltage is applied, independent of the situation. For example, the microcontroller in the control unit may execute this programming. The programmable charge current source may be configured as a current mirror or as a current controller having a shunt resistor.

In the present context, "programming" means that during operation, the charge current source receives signals which interpret the charge current source in such a way that it results in a value for the charge current.

As a result of the measures and refinements stated in the dependent claims, advantageous improvements of the control unit and method for operating a safety system for a vehicle stated in the independent patent claims are possible.

The step-up converter and the at least one step-down converter are advantageously directly connected to one another. This means that there is at least one line that leads from the output of the step-up converter into the input of the step-down converter. It is possible for capacitors and/or resistors to be connected to this line.

It is also advantageous that a capacitive load for summing the output inductive switching currents of the step-up converter, output via a freewheeling diode or a synchronously controlled freewheeling transistor, is connected to the output of the step-up converter. This capacitive load should be as small as possible. This is achievable with the aid of a converter having a high clock frequency of 1 MHz to 10 MHz. The target values should be in a range of 1 µF to 20 µF, and implemented as so-called multilayer ceramic chip (MLCC) capacitors. By reducing the output capacitance of the step-up converter to these values, no further measures from the vehicle electrical system are necessary for limiting the starting current (cost reduction). The starting current is limited to several µs (<30 µs), and its amplitude is determined to a great extent by the impedance of the vehicle electrical system. In addition, stable operation of the step-up converter may be achieved as a result of this capacitive load. This is made possible by tuning the controller to this load. For this purpose, positive feedback must be reliably avoided (instability). This may be improved in a targeted manner, without additional costs, by using series resistors/inductors, which are present anyway, between the freewheeling circuit and the output capacitor (definition of resistance/inductance of the printed conductor, bonding wires between the freewheeling diode and the output capacitor).

Furthermore, it is advantageous that the control unit has a logic system which, during charging of the energy reserve storage, carries out an initial measurement of a capacitance of the at least one energy reserve storage as a function of at least one electrical parameter at the at least one energy reserve storage, and subsequently carries out a measurement of an equivalent internal resistance of the at least one energy reserve storage. This logic system is usually present in the microcontroller, which reads out the data necessary for this purpose, for example concerning the variation of voltage over time at the at least one energy reserve storage. The initial measurement of the capacitance and the measurement of the internal resistance are triggered via the SPI interface and as a function thereof. In the present context, "charging the at least one energy storage" is intended to mean the charging of the energy storage after switching on, i.e., power-on, of the control unit.

The logic system advantageously has at least one comparator for comparing the at least one electrical parameter, in the present case usually a voltage, for example the voltage over the electrical energy reserve storage, to a predefinable threshold, the initial measurement of the capacitance and the measurement of the internal resistance being carried out based on this comparison. That is, the measurement of the capacitance is carried out when the voltage over the energy reserve storage having the capacitor reaches a predefined value. By using, for example, two comparator values, the charging time that is necessary for passing through a predefined measuring band may be ascertained with the aid of an integrated counter, for example 10 bit/10 KHz. A measuring current of 90 mA may consistently be used. Thus, the capacitance results from the following formula:

$$CER = \text{measuring current} \times \text{charging time}/\text{measuring band}.$$

Also for measuring the so-called equivalent internal resistance of the energy reserve, and thus, the energy reserve storage, two comparator values may be used to determine whether the internal resistance of the energy reserve storage is sufficiently small. For example, for a change in measuring current from 90 mA to 930 mA, a voltage change of 0.5 V. for example, that is achieved as the result of a comparator threshold, is queried 10 µs after changing the measuring current. If this threshold is exceeded, the internal resistance is <0.6 ohm, for example. For a voltage change of 1 V, for example, a second comparator test location is queried after applying the measuring current. If this threshold is exceeded, the internal resistance is greater than 1.2 ohm. The sequential control may thus be implemented in the microcontroller, but may be also implemented as hardware using a logic system in the ASIC. Likewise, the measuring device may be implemented by the analog-digital converter (ADC) of the microcontroller, or by voltage comparators and counters in the ASIC system. The microcontroller in the ASIC may trigger the start of the measurement, and the exact starting time is specified by the hardware when VER_min is reached. The triggering may occur, for example, by reading the result register of the initial capacitance. The result register is not overwritten if no measurement is carried out.

Furthermore, it is advantageous that the logic system is configured in such a way that after the energy reserve storage is charged, the logic system is able to cyclically carry out another measurement of the capacitance. A comparator threshold may be used for this purpose as well. This measurement begins after a read operation by the microcontroller on the result register of the cyclical capacitance measurement. The charge current source is blocked as a result of this operation. The voltage drops due to loads which are not cost-relevant, for example at a voltage divider. When the voltage over the energy reserve storage reaches a predefined value, the energy reserve is recharged with the measuring current until another value is reached. By selecting a reduced measuring stroke and a measuring current appropriately tuned thereto, the resolution of µF remains exactly at the value of the initial capacitance measurement.

In one refinement, it is provided that measuring errors in the measurement of capacitance and internal resistance due to an interruption in the battery voltage are avoided by monitoring the input voltage, using a comparator. If the input voltage drops below the value previously determined by the comparator, each ongoing measurement is identified as "unperformable" in a measuring memory. As an alternative, the current controller of the charge current source generates an adjustment status in the measurement application. The ongoing measurement proceeds without interference, and is therefore considered valid, only when this adjustment status, except for transient recovery times, achieves the same adjustment time as the measuring period itself. That is, the adjustment to the target current is carried out immediately, and remains in this adjusted state until the end of the measuring period. Otherwise, the measured value is identified in the measuring memory as "unperformable." Likewise, a 10-bit-counter having a clock frequency of 10 kHz may be used for detecting the adjustment status. Smaller resolutions are also conceivable.

It is also advantageous that the charging of the at least one energy reserve storage by the charge current source takes place in a first time segment and a third time segment at a first current level, in a second time segment at a test current, and in a fourth time segment at a second current level which is below the first current level, the first, second, third, and fourth time segments in this sequence occurring in succession, and an initial measurement of the capacitance and of the internal resistance of the energy reserve storage taking place in the second time segment. The switching between the first current level and the test current level, and between the first current level and the second current level, takes place based on a voltage over the energy reserve storage. That is, the voltage over the energy reserve storage is compared to predefined threshold values.

It is also advantageous that the control unit starts up in energy-saving mode. Since the step-up converters are able to form output voltage practically synchronously with switching on the control unit voltage due to the fact that the energy reserve storage(s) is/are not charged (charge current source remains initially blocked). The computer (microcontroller) is supplied with electrical power by at least one step-down converter which is connected to the output of the step-up converter; i.e., in the present case an energy-saving mode is provided which reduces the withdrawal from the vehicle battery by advantageously making use of the charge current source to avoid this charging of the internal energy storage of the control unit, or to carry out the charging only when this is desired (µC program, data transfer via CAN, FlexRay, LIN). The input voltage is converted into a lower output voltage in the step-down converter. One advantageous form of the step-down converter configuration is to connect two step-down converters in series, which convert the voltage down in a stepwise manner. These two step-down converters, the same as the step-up converter, are under capacitive load. This energy-saving mode is used, for example, for automobiles in showrooms, in that, for example, the control unit receives the instruction via a diagnostic tester to go into this energy-saving mode. Another option for the energy-saving mode is keyless entry, in which a defined state is switched on without starting the actual application.

Exemplary embodiments of the present invention are illustrated in the drawings, and are explained in greater detail in the following description.

DETAILED DESCRIPTION

Figure 1:
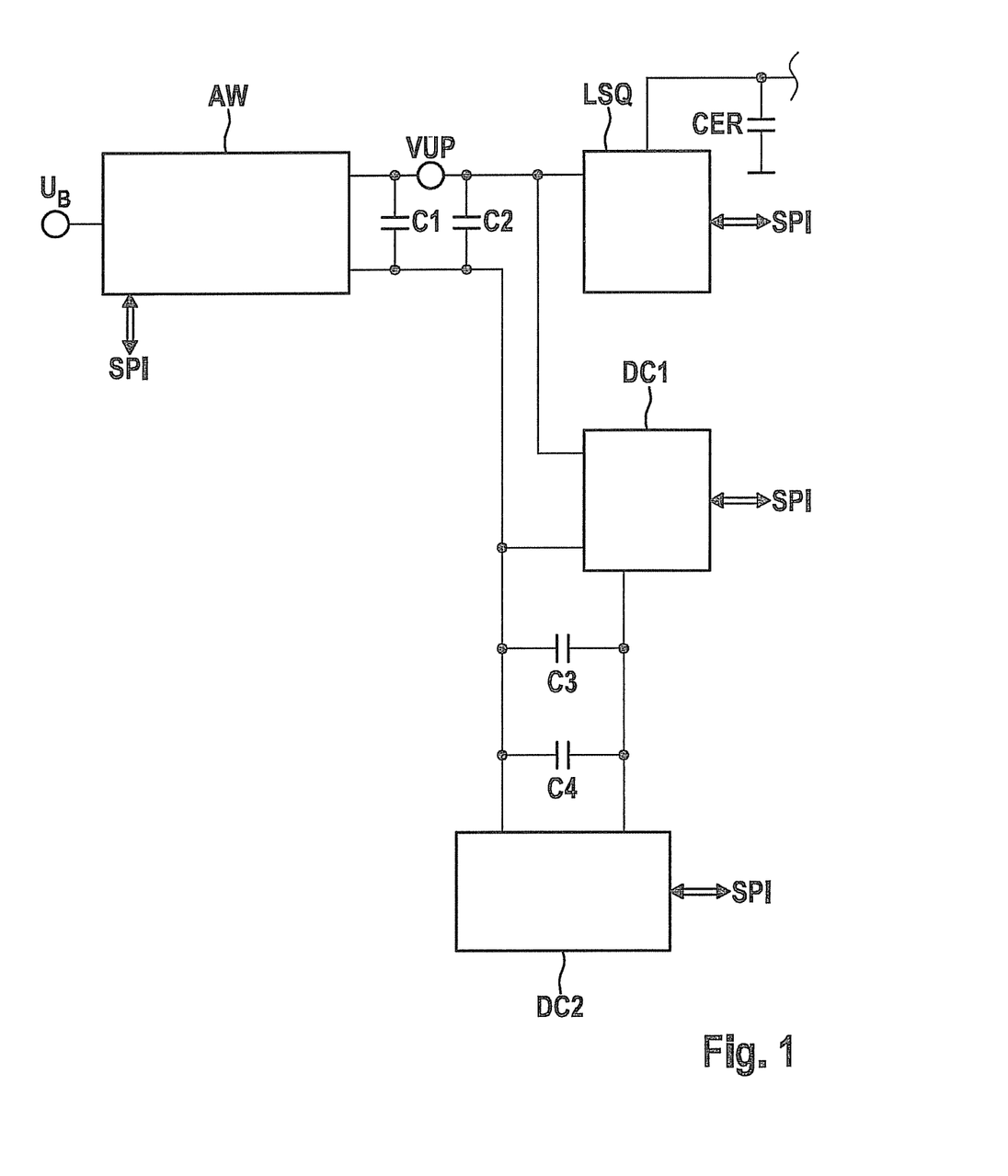
FIG. 1 shows a block diagram of the control unit according to the present invention.

FIG. 1 shows, in a block diagram, a portion of the control unit which is included in the exemplary embodiments and/or exemplary methods of the present invention. Battery voltage UB is applied, for example via filters and/or with polarity reversal protection, to a step-up converter AW, specifically, at the input thereof, so that step-up converter AW increases battery voltage UB or the voltage derived therefrom to a predefined level. The output voltage at downstream capacitor C1, connected parallel to the output via a section of a printed conductor, is denoted by reference character VUP. Step-up converter AW is controllable mainly via an SPI interface, it being possible for primarily the following parameters to be changed: on/off, clock frequency, edge steepness of transistors T1, T2, current limiting of T1, T2, output voltage 23 . . . 25 V/31 . . . 35 V). In the present case, capacitors C1 and C2, connected in parallel at the output, are so-called multilayer ceramic chip (MLCC) capacitors, having a size of 1 µF to 20 µF, which ensure stable operation of the step-up converter. These capacitors C1 and C2 have a low impedance, but at the high converter frequency used in the present case, namely, 1800 kHz to 2200 kHz, for example, which allows disturbances in the medium wave range to be avoided, stable control is still achieved. As the result of targeted, defined layout measures, the inductance per unit length of 5 . . . 15 mohm/5-10 nH per centimeter, for example, of the connection of these converter output capacitances may be used to achieve sufficient impedance values. A value of 0.125 ohm for a length of 1 cm, a width of 0.5 mm, and a thickness of 35 µm has proven advantageous for connecting output capacitors C1 and C2. The current output by the converter results in a voltage at the inductance per unit length of C1 and C2 without time delay, thus allowing stable control. Step-down converters DC1 and DC2, which are connected in series to the output of step-up converter AW and described below with reference to FIG. 1, are placed in such a way, in particular on a shared ASIC, i.e., a shared integrated circuit, in which the step-up converter, the two step-down converters DC1 and DC2, and charge current source LSQ are situated, that the converter output capacitance of step-up converter AW may be connected to a printed conductor having a length of 1 cm, a width of 0.5 mm, and a thickness of 35 µm, resulting in a resistance per unit length for an inductance of 5 . . . 15 mohm/5-10 nH in order to make the converter generally stable. At the same time, however, also using the same capacitance, the function of an input buffer capacitance of the subsequent converters, i.e., DC1 and DC2, is achieved when the input buffer capacitance is coupled with a small printed conductor length of 0 mm to 5 mm to the input of the subsequent converter stage. In this way the voltage noise is reduced and the radiant emittance is decreased. This method may also be similarly used for coupling the two step-down converters DC1 and DC2.

Output voltage VUP, i.e., the charging voltage subject to demand, is used by charge current source LSQ to charge energy reserve CER, i.e., the energy reserve storage, which is connected to the output of the charge current source, in order to be equipped for autonomous operation. However, the ignition is usually always carried out via this capacitor CER, i.e., also in the case of non-autonomous operation. In the present case, the target voltage is denoted by reference character VER. Charge current source LSQ in addition to step-down converters DC1 and DC2 are also controllable and programmable via serial interface SPI, which may be by the microcontroller, which is not illustrated here. With respect to charge current source LSQ, programming is necessary with regard to which current is used for charging capacitor CER. Capacitor CER is usually an electrolytic capacitor, although other types of capacitors are also possible. Likewise, the level of the capacitance and ESR measuring current, as well as the clock frequency of the time measurement, may be adjustable.

Charge current source LSQ has a current controller. Such a current controller controls the current to the programmed current level which has been established by the microcontroller of the control unit. This programming of the current allows an initial measurement of the capacitance and of the equivalent internal resistance of capacitor CER to be carried out in the charging phase after switching on the control unit. This measurement is necessary to verify the functionality of this capacitor so that the energy reserve may also be used for the ignition, for example of airbags or seat belt tensioners. The measuring results are advantageously stored in the control unit in order to be available for a subsequent verification of functionality. Components which are part of the operation of the control unit but not necessary for understanding the invention have been dispensed with here for the sake of simplicity.

By adjusting the charge current, the rise rate via which capacitor CER is charged to its predefined voltage is also adjustable. In addition, operating modes such as a current-saving mode are possible, in that the charge current source does not charge capacitor CER in such a current-saving mode. The microcontroller, which is to be operated in such a current-saving mode, also referred to as eco mode, is then supplied with the necessary power via step-down converters DC1 and DC2, which are directly coupled to the step-up converter. It is possible to set a predefined system-ready time by adjusting the charging rate of energy reserve CER.

The ignition circuits are connected to energy reserve CER so that energy reserve CER is able to supply the ignition circuits with power in case of deployment. The remaining components of the control unit are supplied in autonomous operation via step-down converters DC1 and DC2.

Step-down converters DC1 and DC2 are operated, at least partially, inversely with respect to step-up converter AW. The converters in each case also have inductors, and have the task of appropriately converting the voltages down. Interfaces are connected to the step-down converters in order to supply the electronics system in the control unit with the appropriate voltage levels. Such voltage levels are described in greater detail below. It is possible that step-down converter DC1 does not provide such a supply, but, rather, converts the voltage down to a first level which second voltage converter DC2 uses to convert the voltage level further down. In addition, step-down converters DC1 and DC2 are operated, at least partially, inversely with respect to step-up converter AV. When at least one step-down converter is connected to the output of step-up converter AW, voltage VUP is reduced, and voltage VER is reduced as well. In the absence of energy reserve CER or if the step-up converter is defective, the battery voltage is reduced to the output voltage of this step-down converter. The inverted operation of step-up and step-down converters means that the charging phase is started in the step-up converter, and then the so-called freewheeling phase is started in the step-down converter. The "charging phase" means that the inductor is charged, and the "freewheeling phase" means that the energy is output from the inductor. Switching between these two phases is carried out in a switching converter. If step-up converter AW is in the freewheeling phase, i.e., in the phase in which energy is transported to output VUP, at a given phase overlap, step-down converter DC1 once again immediately withdraws energy from output VUP. As a result, the alternating component of the VUP control voltage is reduced, and a contribution is thus made using the smallest possible, inexpensive ceramic capacitors at output VUP. The ceramic capacitors are capacitors C1 and C2, and capacitors C3 and C4, between the two step-down converters DC1 and DC2.

An additional step-down converter for generating a voltage of 1.2 V to 3.3 V, which is programmable by hardware, is connected to the output voltage of step-down converter DC1. This second step-down converter DC2, the same as first step-down converter DC1, is operated inversely with respect to the step-up converter. In this way, the output of the first step-down converter is counteracted at the exact moment of increasing output voltage by the withdrawal of energy by the second step-down converter. The alternating component of the output voltage of first step-down converter DC1 is thus likewise reduced, and therefore the reduction in the capacitance at the output of the first step-down converter from 150 μF to approximately 30 μF, for example, is assisted.

Figure 2:
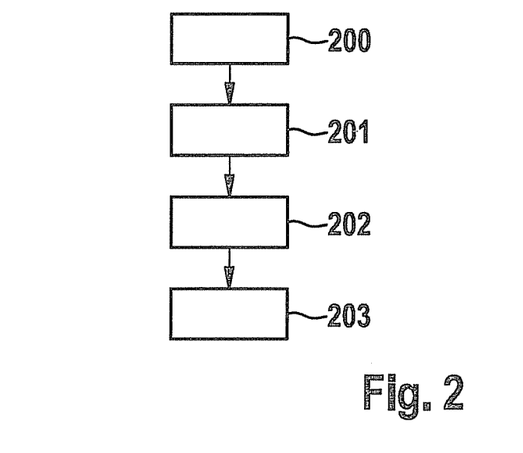
FIG. 2 shows a flow chart of the method according to the present invention.

The flow chart according to FIG. 2 explains the method according to the present invention. Battery voltage UB is filtered or protected against polarity reversal, for example, but at least is provided at the input of step-up converter AW, in method step 200. In method step 201 this step-up converter AW carries out the step-up conversion by being operated as a switching converter. Voltage VUP is thus measurable at the output of step-up converter AW. Charge current source SLQ is programmed via serial interface SPI, so that, as a function of charging voltage VUP, the charge current source charges capacitor CER, which is the energy reserve storage or energy reserve or energy reserve capacitor, with an appropriate current, specifically, to voltage VER. This is carried out in method step 203.

Figure 3:
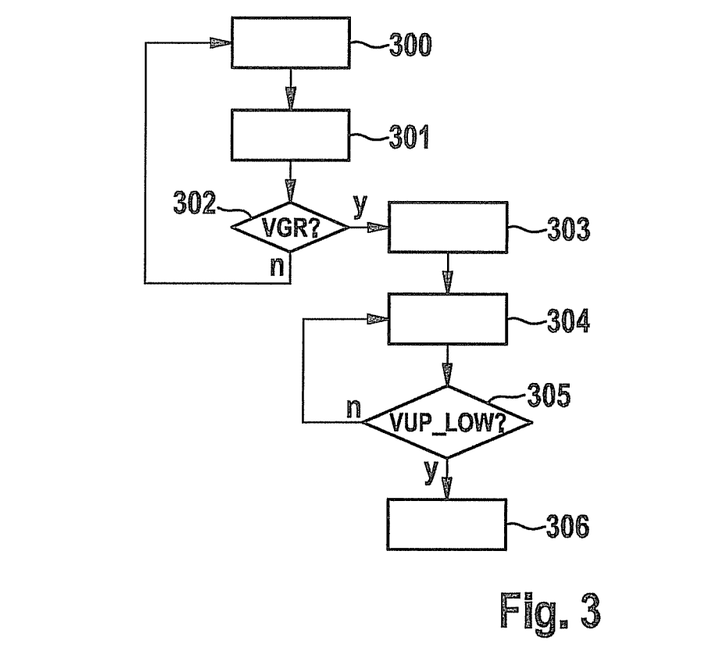
FIG. 3 shows another flow chart of the method according to the present invention.

FIG. 3 refines this flow chart in a further flow chart, method step 203 being incorporated into method step 300 and the preceding method steps from FIG. 2 no longer being carried out. During the charging of the capacitor in method step 300, the voltage at the capacitor is measured in method step 301, for example by the microcontroller, or by the ASIC system, which also contains the converters themselves. In method step 302 this voltage is checked as to whether the voltage at the capacitor has reached threshold VER_min. If this is not the case, the method skips back to method step 300. However, if this is the case, the method may either proceed directly to method step 303, or the output of a test instruction via SPI is awaited in order to initially measure the capacitance of capacitor CER and its equivalent internal resistance ESR. The charging is subsequently resumed in method step 304. The measurement of the capacitance or also the measurement of internal resistance ESR is carried out using a measuring current, which may deviate from the charge current.

In method step 304 the charge current from method step 300 is picked up again, either automatically or after a request by microcontroller μC via serial interface SPI. In this second charging phase, it is checked in method step 305 whether the charging voltage at capacitor CER has reached value VUP low, which is greater than voltage VER_min. If this is not the case, the charging with the charge current is continued.

However, if this is the case, the programming of charge current source LSQ is changed in method step 306 in such a way that a maintenance current is then used which is less than the charge current from method steps 300 and 304. This maintenance current is used to achieve target voltage VUP and to keep the capacitor at this voltage. The step-up converter is operated at such a high frequency and smoothed by the output capacitors in that the charge current source interprets this as direct current.

Figure 4:
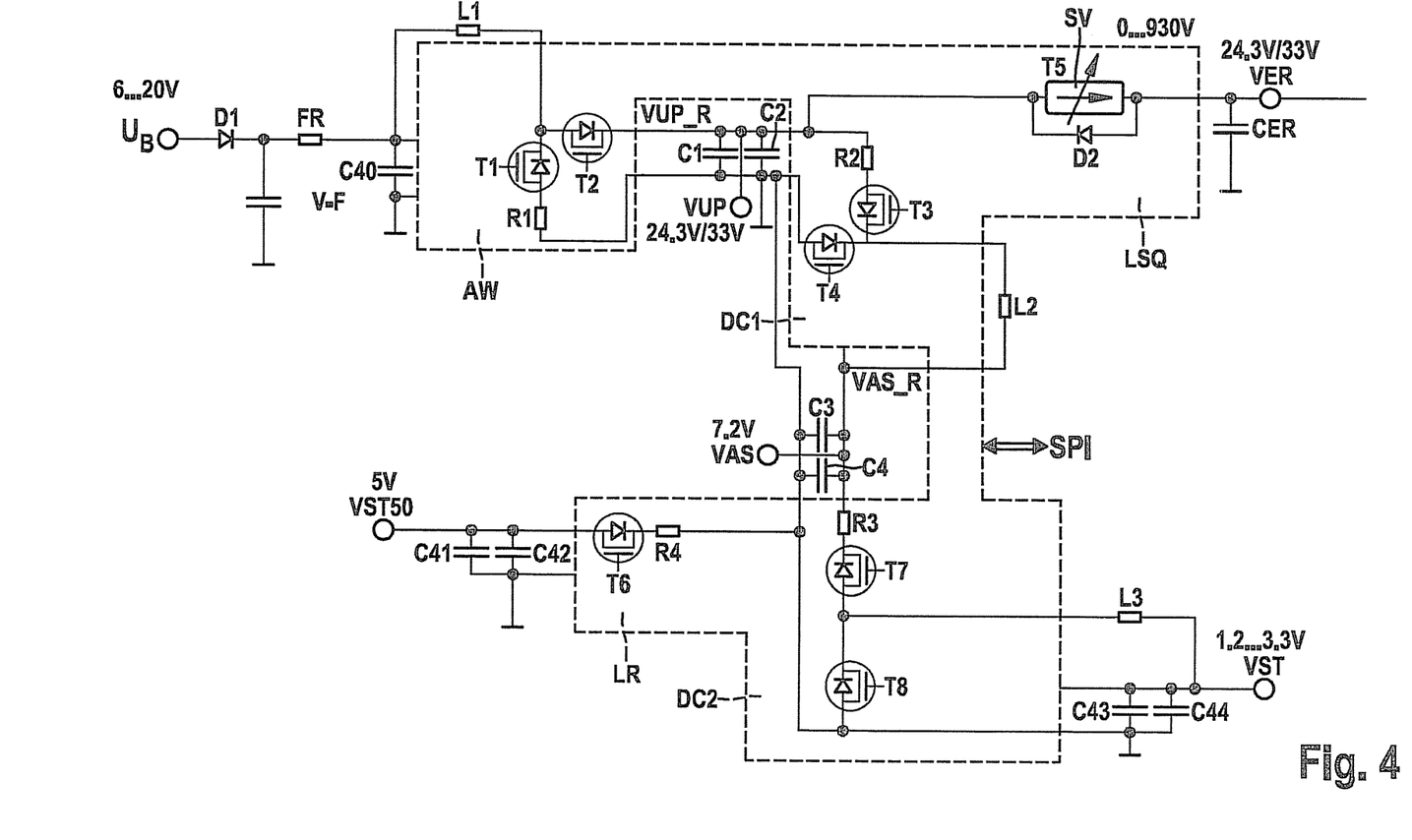
FIG. 4 shows another block diagram of the control unit according to the present invention.

FIG. 4 shows a detailed circuit diagram of components of the control unit included in the present invention. Battery voltage UB, which may assume a value between 26 V, is connected in the flow direction to a diode D1 which acts as polarity reversal protection. A V filter V-F having a discharge to ground is connected to diode D1; this refers to capacitor V-F and C40. A ferrite FA is connected to the diode and to capacitor V-F, which ferrite FA is to an input capacitor C40, which is connected to ground, and inductor L1 of step-up converter AW, and the input of step-up converter AW with regard to its electronics system. Step-up converter AW, together with step-down converters DC1 and DC2, a linear controller LR, and the charge current source, are integrated on a shared ASIC system, which may also contain additional components. This ASIC system may contain the components on a single substrate or on multiple substrates.

Step-up converter AW has N-channel charging transistor T1, which via its drain terminals is connected to inductor L1, and via its source terminal is connected to ground via a resistor R1. In addition, a freewheeling P-channel transistor T2 is present which via its source terminal is connected to the inductor and to transistor T1 (drain), and via its drain terminal is connected to the input of step-up converter controller $VUP_r$. Instead of synchronously controlled transistor T2, a simple ultrafast freewheeling diode (Schottky diode) may be used. At the anode this diode is connected to the inductor and T1 (drain), and at the cathode it is connected to $VUP_r$.

The parallel connection of capacitors C1 and C2 is connected to $VUP_r$. Voltage VUP, which is between 22 V and 34

V, is tapped in this parallel connection. The voltage is measured by microcontroller μC, for example. Charging voltage VUP is connected to the input of charge current source LSQ, which has a parallel connection of current control valve SV and a diode D2 connected against the flow direction, to allow a return flow from capacitor CER, which is connected to the output of charge current source LSQ. A transistor T5 is used as current control valve SV. Diode D2 is generally a component of transistor T5. A current between 0 mA and 930 mA is programmable via the SPI interface. Capacitor CER, which is connected to the output of charge current source LSQ, is connected to ground, and is also connected to the ignition circuit, not illustrated. However, voltage VUP is picked up not only by charge current source LSQ, but also by step-down converter DC1, which converts voltage VUP down into voltage VAS, namely, 7.2 V. Step-down converter DC1 is connected in an inverted manner to step-up converter AW in order to reduce the alternating component of control voltage VUP.

Voltage VUP is connected via a current shunt R2 in step-down converter DC1 to a charging transistor T3 (P-channel) connected downstream at the source terminal, and via the drain terminal of the charging transistor it is connected to inductor L2 of the step-down converter. A further synchronous freewheeling transistor T4 (N-channel) is connected to ground via the source terminal, and via the drain terminal it is connected to inductor L2 and to the drain terminal of T3. Instead of T4, a simple ultrafast freewheeling diode (Schottky diode) may be used. At the anode this diode is connected to ground, and at the cathode it is connected to inductor L2 and to the drain terminal of transistor T3. Inductor L2 is connected to the control input of step-down converter DC1, and at this location it forms control voltage $VAS_r$. Here as well, the same as for the step-up converter, this control input together with the current supply of L2 is connected to a capacitive load, namely, capacitors C3 and C4, which form the output of the step-down converter. Stepped-down voltage VAS may be tapped between C3/C4 (+) and the ground base point. In the present case, this voltage VAS of 6.4 V . . . 7.2 V is picked up by step-down converter DC2, which for this purpose has current shunt R3, switching transistors T7 and T8, and inductor L3. DC2 has a configuration that is analogous to DC1. Output voltage VST, which is between 1.2 V and 3.3 V, is thus formed, and is picked up by the components in the control unit. Downstream from a current shunt R4 and control transistor T6, the voltage of 5 V is output via a linear controller LR which is connected to step-down converter DC1. This voltage may be used as the supply for the CAN bus or FlexRay bus. In addition, a capacitive load having capacitors C41 and C44, which are connected in parallel for redundancy reasons, is provided at this output of linear controller LR.

Step-down converter DC2 also has a P-channel charging transistor T7 and an N-channel freewheeling transistor T8, or instead of T8 has a freewheeling diode. Voltage VAS is connected via a current shunt R3 in step-down converter DC2 to a charging transistor T7 (P-channel) connected downstream at the source terminal, and via the drain terminal of the charging transistor it is connected to inductor L3 of the step-down converter. A further synchronous freewheeling transistor T8 (N-channel) is connected to ground via the source terminal, and via the drain terminal it is connected to inductor L3 and to the drain terminal of T7. Instead of T8, a simple ultrafast freewheeling diode (Schottky diode) may be used. At the anode this diode is connected to ground, and at the cathode it is connected to inductor L3 and to the drain terminal of transistor T7.

The output of step-down converter DC2 is also under capacitive load via the parallel connection of capacitors C43 and C44. Thus, a series connection of step-down converters DC1 and DC2 is present, each of which is connected at the output in a manner functionally equivalent to step-up converter AW, namely capacitively. Furthermore, all of the converters are operated in such a way that the alternating component at the output of the converters is reduced. This results in higher stability.

Figure 5:
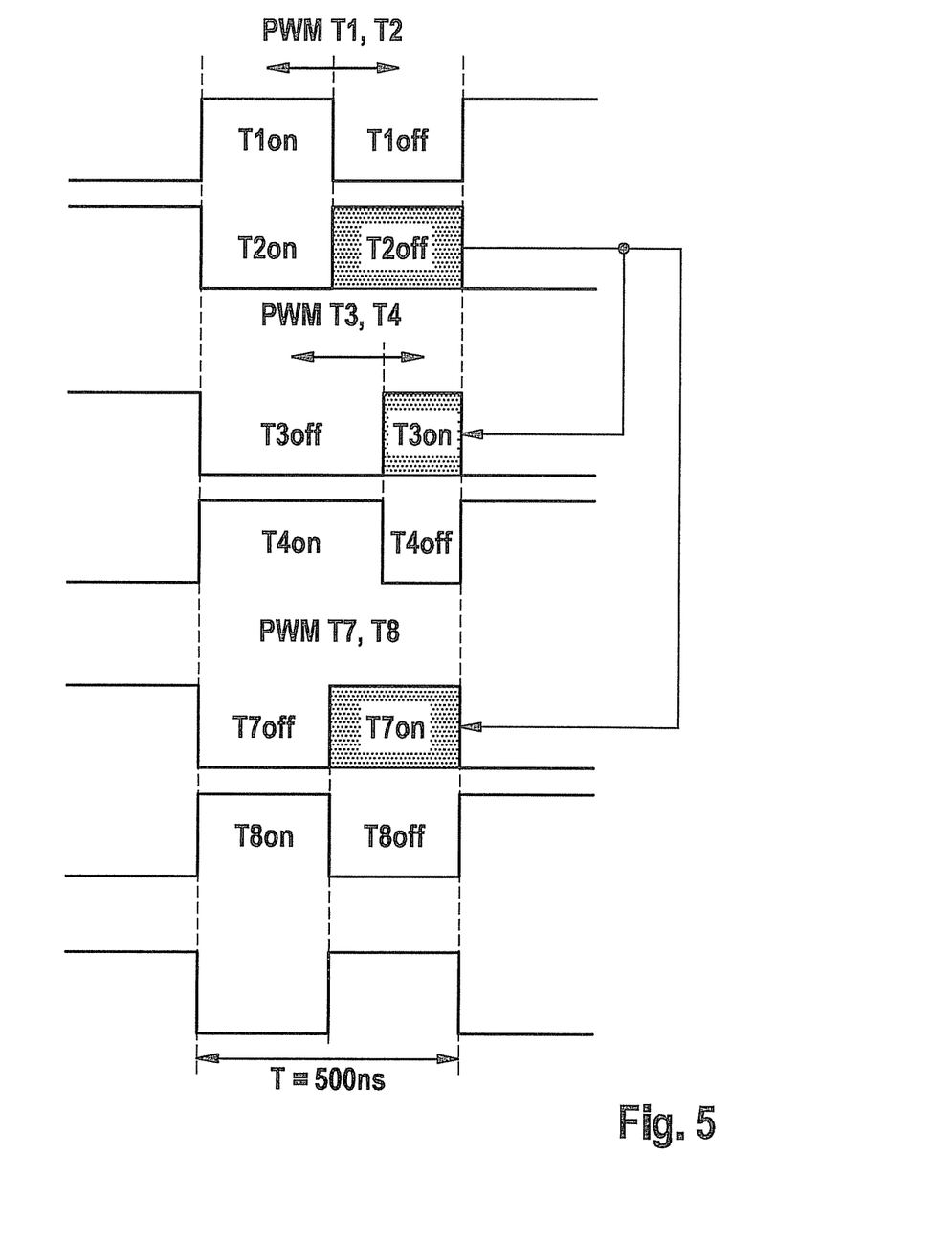
FIG. 5 shows a time diagram for transistors in the switching converters.

FIG. 5 shows the modulation of the transistors of switching converters AW, DC1, and D2. The figure shows in particular the inverted operation with a partial phase overlap. The upper illustration indicates the modulation via pulse width modulation of transistors T1 and T2 of step-up converter AW, and then shows the transistors switched on and switched off. The charging phase is shown in the first phase, and the freewheeling phase is shown in the second phase. In the middle part of the diagram, the pulse width modulation of transistors T3 and T4 of step-down converter DC1 is illustrated, which shows a partial overlap of the charging phase and the enabled phase. At this location there is a complete reversal, with a freewheeling phase being shown first, and then a charging phase. Thus, in the enabled phase of the step-up converter AW, an energy withdrawal by step-down converter DC1 is also shown. Similarly, the relationship of the two step-down converters DC1 and DC2, as indicated in the middle and lower time diagrams, is shown. The cycle of the converters is 500 ns in the present case. One cycle includes the charging phase and the enabled phase.

Figure 6:
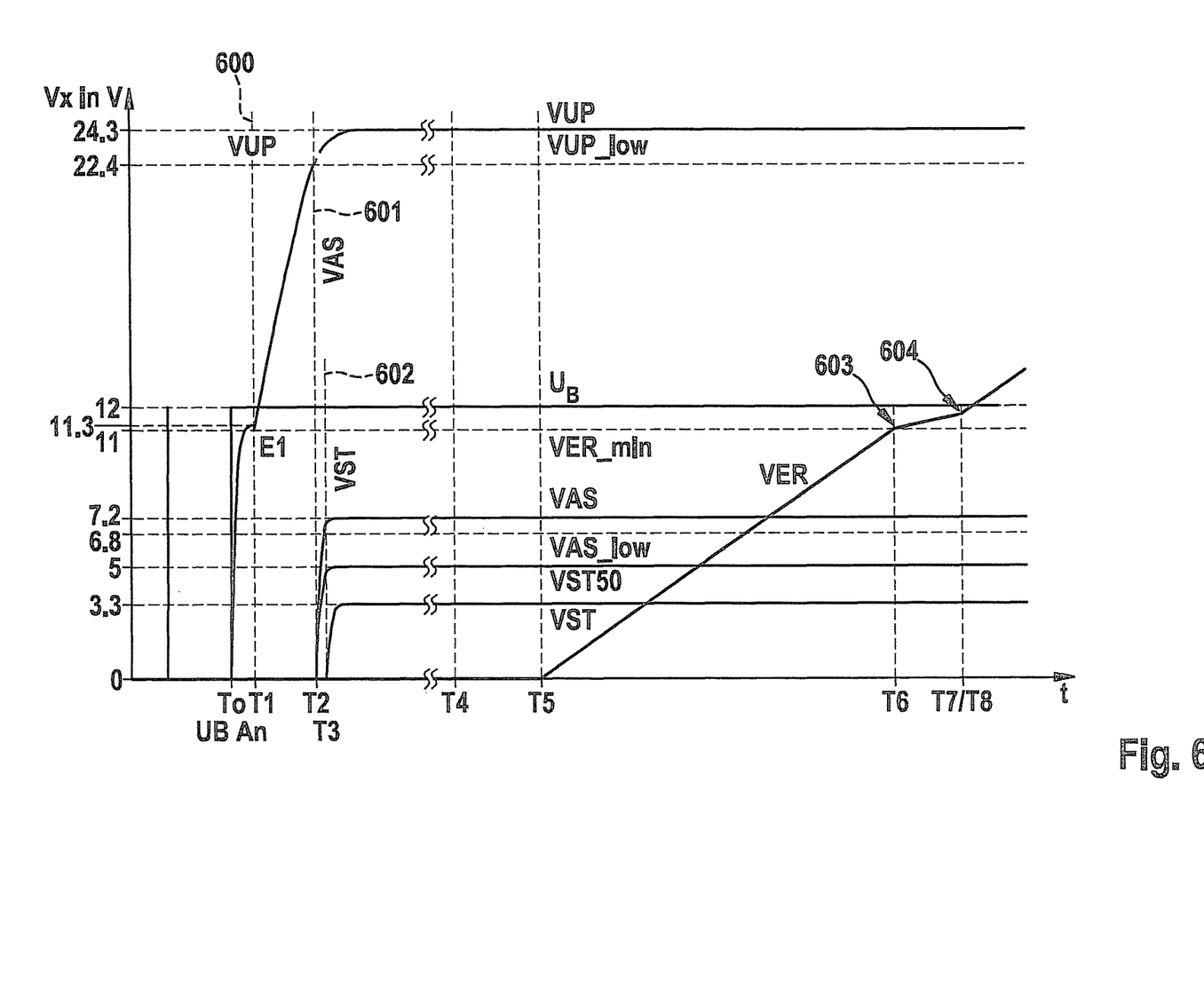
FIG. 6 shows a voltage time diagram.
Figure 7:
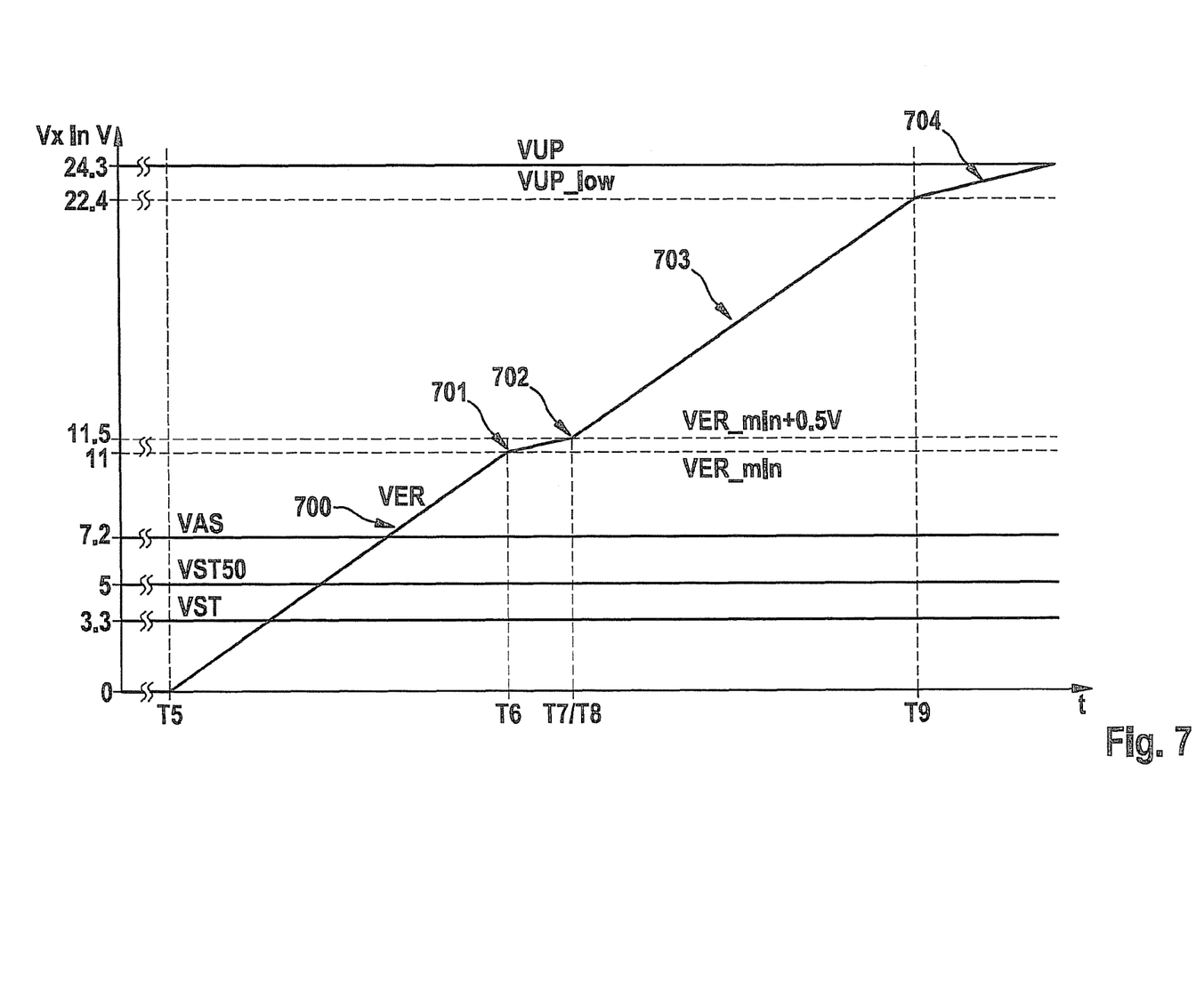
FIG. 7 shows another voltage time diagram.

The mode of operation of the circuit according to FIG. 4 is explained in greater detail in the two voltage time diagrams in FIGS. 6 and 7. FIG. 6 shows the voltages from the time that battery voltage UB is switched on until the equivalent internal resistance of energy reserve CER is measured. FIG. 7 shows the voltage time diagram from the start of the charging phase of energy reserve CER until energy reserve CER reaches the control voltage.

FIG. 6 shows that the voltage supply is switched on at point in time T0. That is battery voltage UB, which reaches 12 V, for example. The switching converter starts at 600, and outputs voltage VUP at its output. The rise corresponds to the supply impedance of the vehicle, to V filter V-F of inductor L1, and to capacitive load C1 and C2. This rise is very rapid in the present case. At point in time T1, which is approximately 30 μs to 70 μs after T0, switching converter AW starts after establishing at least two stable ASIC-internal reference voltages and a defined waiting time, which results from a filter. The reference voltages are checked for a difference; i.e., if there is a difference, an error is present. The waiting time is measured by a counter.

At point in time T2, step-down converter DC1 also starts to run, as indicated by reference numeral 601. This occurs as soon as output voltage VUP of the step-up converter is greater than a predefined value VUP low. This is recognized by step-down converter DC1 itself.

At point in time T3, switching controller DC2 also starts, as indicated by reference numeral 602, and linear controller LR also starts as soon as the output voltage of first step-down converter DC1 falls, below a predefined threshold value VAS_low. At point in time T4, a power-on reset occurs as the result of enabling after stable voltages are generated. Vint is an internal voltage from which the reference voltages are formed, and is formed from a Zener voltage, for example. VRef1 is a so-called band gap voltage which is composed of a transistor emitter voltage and an additive component for temperature compensation. The band gap voltage corresponds to the band gap of silicon. Output voltage VAS of the first step-down converter is in one control band, and the voltages of linear controller LR and of second step-down converter DC2 are also in a corresponding control band, specifically, after a defined charging time of 2 ms to 20 ms which is established by a counter. The voltages are monitored by the ASIC system itself, which contains the converters. Charge current source LSQ is programmed by the microcontroller at point in time T5. The energy reserve charging begins as the result of a primary current level of 210 mA, for example. The voltage at energy reserve VER thus increases linearly. The voltage at energy reserve VER reaches value VER min, for example 11 V, at point in time T6. The primary current level is automatically switched over to a measuring current level of 90 mA, for example, and an at least 10-bit counter is started. The voltage reaches value VER_min+0.5 V at point in time T7. The counter is then stopped. The counter content is stored as the measured capacitance value until the next power-on reset, and the current level is also switched over for the test of the equivalent internal resistance. This current level is 930 mA.

At point in time T8, i.e., T7+10 µs, it is checked whether the voltage over energy reserve CER is ≤VER_min+1 V, and whether this voltage is ≤VER_min+1.5 V. The decision flags are stored until the next power-on reset, and a switch is subsequently made to the programmed primary current level.

This is also shown in FIG. 7. The primary current level results in first rise 700 between points in time T5 and T6, and the measurement of the capacitance and of the equivalent internal resistance is carried out between T6 and T8. The second charging phase, indicated by reference numeral 703, occurs between T8 and T9. The voltage over energy reserve CER reaches value VER_low=22.8 V at point in time T9. The current level is automatically set to the programmed maintenance value, for example 60 mA. The voltage over the energy reserve is then brought to the control value of voltage VUP=22.4 V at a decreased rate. This is indicated by rise 704.

The airbag supply system is ready at point in time T4 as the result of separating energy reserve CER from step-up converter AW. T4 is between 3 ms and 21 ms, depending on the established waiting time. New functionalities such as the so-called eco mode may be achieved in this way. The system executes functions as desired, for example diagnostic communication, without starting the airbag application, and as the result of charging the energy reserve obtains ignition readiness. This may be used, for example, for maintenance, for a vehicle demonstration, etc.

As the result of programming a suitable primary current level, i.e., the charge current, on the one hand requirements for a maximum control unit input current while attaining firing readiness, i.e., the charging phase of the energy reserve, is achieved, and on the other hand a desired charging time may be achieved after selecting the necessary size of the necessary energy reserve.

The capacitance test in this charging phase requires no further measuring sources besides programmable charge current source LSQ, which is already present. By using two comparator values VER min and VER_min+0.5 V, the charging time that is necessary to pass through the measuring band of 0.5 V may be ascertained with the aid of an integrated counter. A measuring current of 90 mA is consistently used. For a measuring time of 102.3 ms, capacitance CER is thus determined by (90 mA×T measuring)/0.5 V), resulting in 18.4 mF.

In this charging phase, the so-called ESR test, i.e., the test of the equivalent internal resistance of the energy reserve, likewise requires no further measuring sources besides programmable charge current source LSQ, which is already present. By using two additional comparator values, namely, VER_min+1 V and VER_min+1.5 V, it may be ascertained whether the internal resistance of the energy reserve is sufficiently small. For a change in measuring current from 90 mA to 930 mA, comparator threshold VER_min+1 V is queried 10 is after applying the current flow. The time in ps is selectable, and in the present case is selected in such a way that the dying out of inductive effects is compensated for without appreciable capacitive recharging. If this comparator threshold is exceeded, the internal resistance is greater than 0.6 Ω. Likewise, comparator threshold VER_min+1.5 V is queried 10 µs after applying the measuring current. If this threshold is exceeded, the internal resistance is greater than 1.2 Ω. This represents an excessively high value, and a warning such as an illuminated light is displayed.

As a result of the feature of the inverted operation of converters coupled in series corresponding to FIG. 4, in the blocking phase of step-up converter AW an attempt is made to bring coupled step-down converter DC1, at least temporarily, into the energy pickup. This measure reduces the alternating component at the output of step-up converter AW. The same method is used with regard to the coupling of step-down converters DC1 and DC2. As a result of the feature of inductively decoupled converter output capacitances due to appropriate line segments, stable converter-controller information may be deduced based on the change in current.

As a result of the feature of an additional comparator threshold after charging the energy reserve, the comparator threshold being denoted by VUP_low+0.33 V, a cyclical capacitance measurement of the energy reserve may be carried out. The measurement starts after a read operation by the microcontroller on the result register of the cyclical capacitance measurement. The result register is likewise situated on the ASIC system. Charge current source LSQ is blocked as a result of this operation. The voltage drops due to loads that are present at voltage VER, such as a voltage divider, a safety switch, etc. If voltage VER reaches value VER low, the energy reserve is recharged with the measuring current, for example 60 mA, until VUP_low+0.33 V is reached. By selecting a reduced measuring stroke and a measuring current which is appropriately tuned thereto, the resolution remains exactly at the value of the initial capacitance measurement. If value VER, i.e., the voltage over the energy reserve, reaches value VER_low+0.33 V, a voltage flag is additionally set to "satisfactory" in a measured value memory which is also situated on the ASIC system. The supply voltage monitoring system feeds voltages VUP, VER, VAS, VST50, VST through a multiplexer, to an analog-digital converter of the ASIC system, so that these values may be read out serially by the microcontroller via the SPI interface.

In the present case, measuring errors in the capacitance measurement and the measurement of the equivalent internal resistance of the energy reserve are also avoided. These measuring errors should be avoided in the situation of an interruption in the battery voltage. For this purpose, two alternative methods are proposed here:

a) input voltage UB is monitored by a comparator, and if the input voltage drops below a threshold at least once during an ongoing measurement, each ongoing measurement is identified as "unperformable" in the measuring memory.

b) the current controller of charge current source LSQ generates an adjustment status in the measurement application. The ongoing measurement proceeds without interference, and is therefore considered valid, only when this adjustment status, except for transient recovery times, reaches the same adjustment time as the measuring period itself; otherwise, the measured value is identified in the measuring memory as "unperformable." Likewise, a 10-bit-counter having a clock frequency of 10 kHz may be used for detecting the adjustment status; smaller resolutions are also conceivable here.

What is claimed is:

1. A control unit for operating a safety system for a vehicle, comprising:
    a step-up converter, which is a switching converter, and which converts an input voltage, which is derived from a vehicle battery voltage, into a higher charging voltage at its output, the step-up converter including a first inductor;
    at least one energy reserve storage which is charged via the higher charging voltage for operating the safety system in the case of autonomous operation; and
    at least one step-down converter that converts the higher charging voltage or a voltage received from the at least one energy reserve storage, into a lower charging voltage at its output, the step-down converter including a second inductor,
    wherein the step-up and step-down converters operate in at least two modes, the at least two modes including a first mode and a second mode in which the step-down converter is operating inversely with respect to the step-up converter,
    wherein in the first mode, the step-up converter being in a charging phase in which the first inductor is being charged and the step-down converter being in a freewheeling phase in which energy is being output from the second inductor, and
    wherein in the second mode, the step-up converter being in a freewheeling phase in which energy is being output from the first inductor and the step-down converter being in a charging phase in which the second inductor is being charged.

2. The control unit of claim 1, wherein the at least one step-down converter is connected directly to the step-up converter.

3. The control unit of claim 1, wherein a capacitive load for setting a rise time of the higher charging voltage is connected to the output of the step-up converter.

4. The control unit of claim 1, wherein the control unit has a logic system which, during charging of the energy reserve storage, performs an initial measurement of a capacitance of the energy reserve storage as a function of at least one electrical parameter at the energy reserve storage, and subsequently performs a measurement of an equivalent internal resistance of the energy reserve storage.

5. The control unit of claim 4, wherein the logic system has at least one comparator for comparing the at least one electrical parameter to a predefined threshold, the initial measurement of the capacitance and the measurement of the internal resistance being performed based on this comparison.

6. The control unit of claim 4, wherein the logic system is configured so that after the energy reserve is charged, the logic system cyclically performs another measurement of the capacitance.

7. A method for operating a safety system for a vehicle, the method comprising:
    converting an input voltage, which is derived from a vehicle battery voltage, into a higher charging voltage at an output of a step-up converter, which is a switching converter, the step-up converter including a first inductor;
    charging at least one energy reserve storage via the higher charging voltage for operating the safety system in the case of autonomous operation;
    converting, using a step-down converter, the higher charging voltage or a voltage received from the at least one energy reserve storage into a lower charging voltage, the step-down converter including a second inductor; and
    operating the step-up and step-down converters in at least two modes, the at least two modes including a first mode and a second mode in which the step-down converter is operating inversely with respect to the step-up converter,
    wherein in the first mode, the step-up converter being in a charging phase in which the first inductor is being charged and the step-down converter being in a freewheeling phase in which energy is being output from the second inductor, and
    wherein in the second mode, the step-up converter being in a freewheeling phase in which energy is being output from the first inductor and the step-down converter being in a charging phase in which the second inductor is being charged.

8. The method of claim 7, wherein the at least one step-down converter is connected directly to the step-up converter.

* * * * *